United States Patent [19]
Young et al.

[11] 3,949,058
[45] Apr. 6, 1976

[54] PRODUCTION OF AMMONIUM POLYPHOSPHATES

[75] Inventors: Donald C. Young, Fullerton; Bruce A. Harbolt, Northridge, both of Calif.

[73] Assignee: Union Oil Company of California, Brea, Calif.

[22] Filed: Dec. 20, 1973

[21] Appl. No.: 426,902

[52] U.S. Cl. ............... 423/313; 423/305; 423/309; 71/43
[51] Int. Cl.² ................... C01B 15/16; C01B 25/26
[58] Field of Search ........................... 423/305–313; 71/43

[56] References Cited
UNITED STATES PATENTS

| | | | |
|---|---|---|---|
| 3,420,624 | 1/1969 | Fikh | 423/305 |
| 3,503,706 | 3/1970 | Legal | 423/305 |
| 3,775,534 | 11/1973 | Meline | 423/310 |

OTHER PUBLICATIONS

The Condensed Chemical Dictionary, 8th ed., 1971 pp. 712–713.
New Developments in Fertilizer Technology, 10th Demonstration 1974, p. 6.

*Primary Examiner*—Oscar R. Vertiz
*Assistant Examiner*—Gregory A. Heller
*Attorney, Agent, or Firm*—Michael H. Laird; Lannas S. Henderson; Richard C. Hartman

[57] ABSTRACT

There is disclosed a method and apparatus for the production of ammonium polyphosphate solutions of high concentrations from phosphoric acid and ammonia. The process is ideally suited for the production of such solutions from wet-process phosphoric acid which has a $P_2O_5$ content of from 56 to about 70 weight percent, impurity-free basis, and which, preferably, contains from 5 to about 50 percent of its phosphorus present as polyphosphoric acid. The method comprises introducing the phosphoric acid into a reactor bearing a Teflon liner and reacting it therein with vapors of ammonia while controlling the amount of ammonia from 0.2 to about 0.3 pound ammonia per pound of $P_2O_5$ in the feed acid, sufficient to achieve a peak reaction temperature in the reactor between about 525° and 775°F., the absolute value of which is dependent on the bulk water content of the feed acid. The products from the reactor are quenched by direct contact with an aqueous solution of ammonium polyphosphate, additional ammonia is added to neutralize the phosphoric acid to a pH value between about 5.5 and about 8.5 and sufficient water is added to achieve a concentration of from 24 to about 55 weight percent $P_2O_5$ in the aqueous solution. Preferably, the aqueous solution is continuously circulated, cooled and passed to a storage vessel which serves as a product accumulation and supply of circulating liquid. The preferred apparatus of the invention comprises a tubular reactor having inlet sparging means for the ammonia vapors and phosphoric acid to introduce these reactants into intimate contact at the inlet portion of the reactor. The reactor and the inlet spargers are formed of Teflon and it has been found that the Teflon provides a scale-resistant lining for the reactor surfaces such that the reactor can be operated for extended periods of time without requiring shutdown for cleaning and maintenance.

11 Claims, 11 Drawing Figures

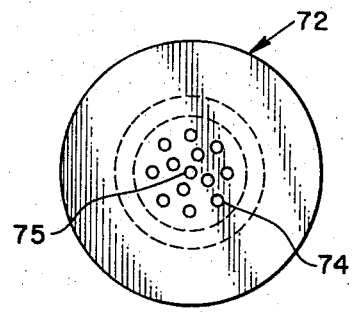
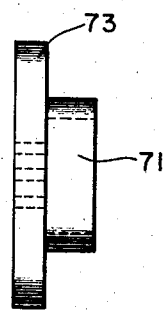
*FIG 3*   *FIG 4*
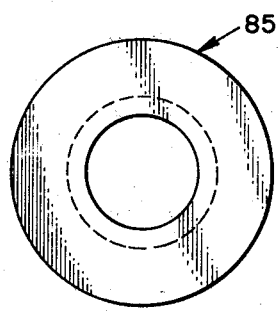
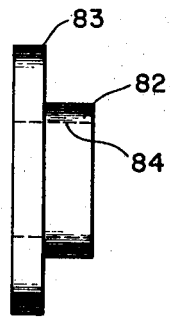
*FIG 7*   *FIG 8*
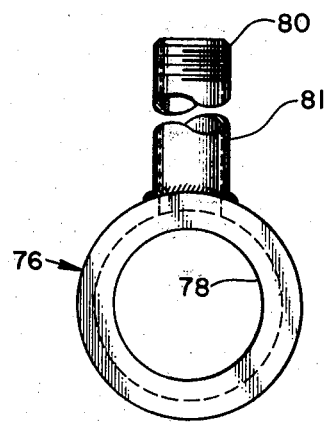
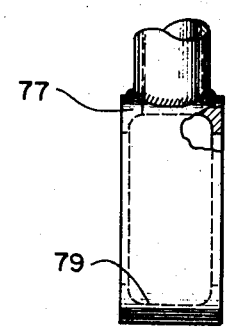
*FIG 5*   *FIG 6*

PRODUCTION OF AMMONIUM POLYPHOSPHATES

BACKGROUND OF THE INVENTION

Ammonium phosphate solutions which contain a high percentage of the phosphorus present as polyphosphates are highly desirable because the polyphosphates are subsequently more soluble than orthophosphate. When the phosphate is derived from wet-process phosphoric acid, which constitutes the majority of commercial phosphoric acid, the polyphosphates also function to chelate the congeneric metallic impurities of the wet-process phosphoric acid and avoid their precipitation in the ammonium phosphate solution. A high concentration of polyphosphates for this purpose is also desired to avoid any instability upon storage of such solutions that could be caused by the hydrolysis of the polyphosphate to levels below its effective concentration for preventing precipitation of the metallic impurities.

The formation of polyphosphoric acid or polyphosphates requires the expenditure of a considerable amount of energy for the evaporative dehydration of the phosphoric acid. It has been suggested that the exothermic heat of neutralization of phosphoric acid with ammonia be utilized as a source of energy for the molecular dehydration of the acid; see German Patent 6321. While this technique is operative for laboratory demonstrations, heretofor it has not been utilized in an entirely successful commercial installation. A large number of prior attempts have been made and many of these have concentrated on the reaction of ammonia and phosphoric acid in a tubular reactor using a continuous flow system. Typical of these are U.S. Pat. Nos. 2,902,342; 3,419,379; 3,420,624; 3,464,808; and 3,649,175.

The tubular reactor is ideally suited for this reaction since it provides a minimal residence time of the reactants and products and provides sufficient turbulence for adequate mixing of the reactants, completion of the reaction and dehydration of the orthophosphate. Phosphoric acid, however, and, in particular, wet-process phosphoric acid, is not readily amenable to such processing. The high temperatures involved in the evaporative neutralization of the acid can cause formation of insoluble precipitates with the metallic impurities. These precipitates occur because the temperatures are often sufficient to form minute amounts of cyclic or metaphosphates. The latter react with the metallic impurities to form refractory precipitates which coat the inside surfaces of the reactor, often plugging it and requiring discontinuance of the reaction after a few hours of operation. Attempts to lessen the degree of this precipitation generally involve limiting the reaction to temperatures less than the maximum which could be attainable.

It is, therefore, an object of this invention to provide a process for the production of ammonium polyphosphates which will achieve the maximum conversion to polyphosphates.

It is, furthermore, an object of this invention to provide such a process which utilizes substantially all the exothermic heat of reaction between ammonia and phosphoric acid to concentrate the acid and effect molecular dehydration of the phosphates.

It is a further object of the invention to operate such a process at the maximum temperature that can be obtained and to operate the process under substantially abiatic conditions.

It is also an object of the invention to provide a reactor which can be used in the aforestated process for prolonged periods of time without requiring repair, maintenance and cleaning.

Other and related objects will be apparent from the following discussion of the invention.

BRIEF STATEMENT OF THE INVENTION

This invention comprises a method for the continuous ammoniation of phosphoric acid in a reactor under substantially abiatic conditions to molecularly dehydrate the acid and form polyphosphates therein. The invention also comprises a reactor that can be used in the process which is substantially free from the formation of scale deposits.

It has been found that when the reaction between ammonium and phosphoric acid is performed in a reaction zone defined by a polytetrafluoroethylene resin such as Teflon substantially no scale deposits accumulate in the reaction zone. It is believed that the polytetrafluoroethylene is ablative under the high temperatures and conditions of the reaction and that scale deposits, if formed in the reactor, are dislodged therefrom. Regardless of the mechanism, no accumulation of scale deposits occurs and the reactor remains clean and unobstructed even after prolonged periods of use. The use of a reaction zone defined by the polytetrafluoroethylene resin permits the neutralization of phosphoric acid with ammonia vapors under substantially abiatic conditions and the maximum amount of the exothermic heat of neutralization is available for the molecular dehydration of the orthophosphate. This permits operation of the process at the maximum obtainable temperatures, e.g., temperatures from about 525° to about 775°F., usually about 620° to about 775°F., depending on the feed acid concentration, and permits maximum conversion of the orthophosphate to the desirable polyphosphate species. The method of the invention, therefore, comprises the neutralization of phosphoric acid with ammonia vapors under substantially abiatic conditions at a temperature from 525° to about 775°F., the latter being controlled by the control of the amount of ammonia introduced into the neutralization reactor in proportion to the amount of phosphoric acid. The continuous process can be controlled by supplying phosphoric acid thereto at a substantially constant and controlled flow rate and introducing ammonia vapor into reaction therewith at a rate controlled to achieve the maximum reactor temperature.

The crude reaction product can be discharged directly into a solution of ammonium polyphosphate product and additional ammonia can be added to the stream to complete the neutralization of the phosphoric acid to a pH value from about 5.5 to about 8.5. Water can also be added to the solution to dilute the crude reaction product to the desired concentration, typically to a value from about 24 to about 55 weight percent $P_2O_5$. The solution can then be passed through heat exchange means in indirect contact with liquid ammonia to vaporize the ammonia for use in the process and, thereafter, through heat exchange means in indirect contact with cooling water.

BRIEF DESCRIPTION OF THE DRAWINGS

The invention will be described by reference to the illustrated, preferred embodiment thereof shown in the FIGURES of which:

FIGS. 3 and 4 illustrate the polyfluorohydrocarbonammonia distributor used in the tubular reactor;

FIGS. 5 and 6 illustrate the phosphoric acid inlet distributor of the tubular reactor;

FIGS. 7 and 8 illustrate the polyfluorohydrocarbon inlet flange of the tubular reactor;

DESCRIPTION OF THE PREFERRED EMBODIMENTS

Figure 1:
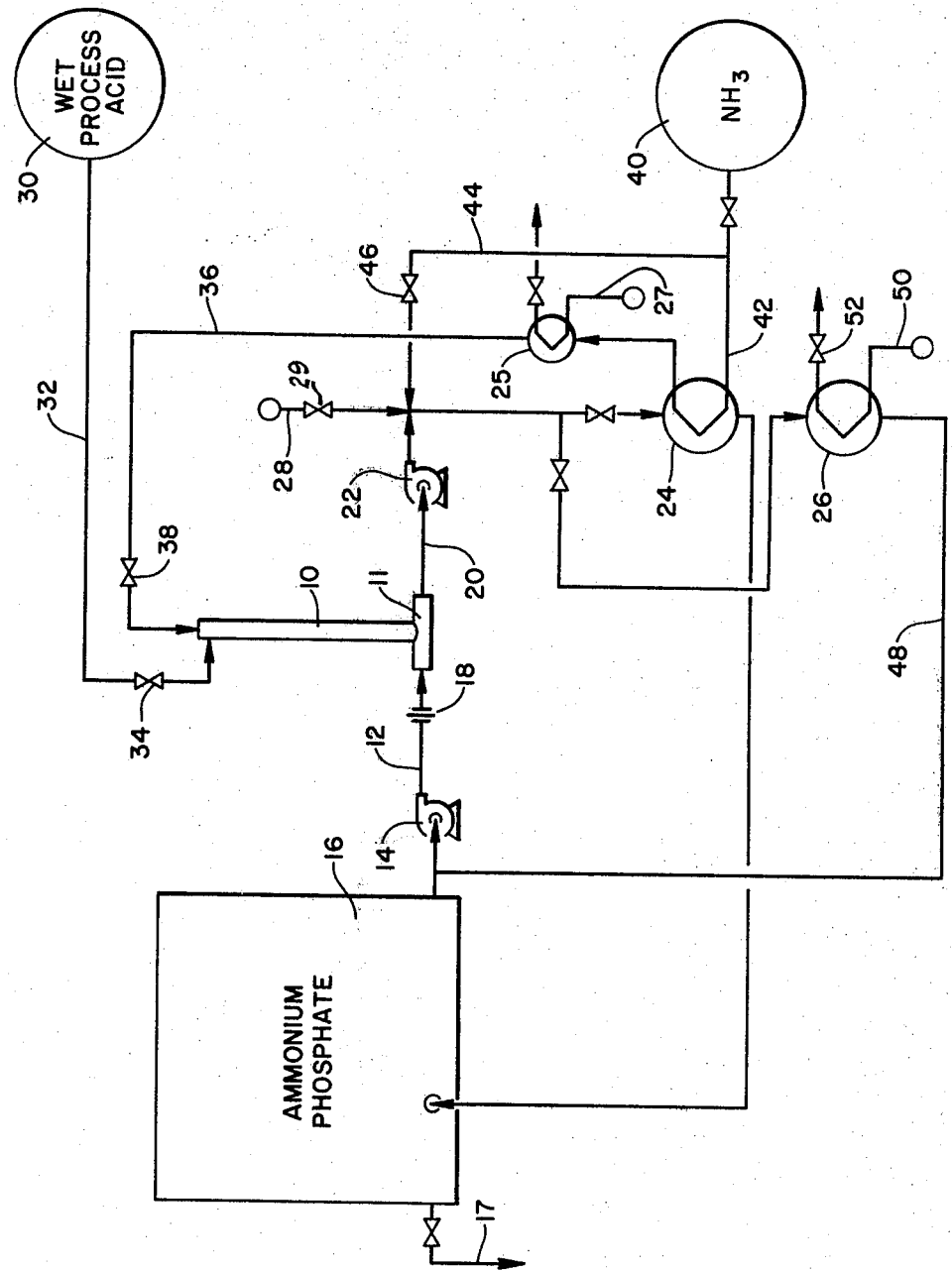
FIG. 1 is a flow diagram of the preferred process.

Referring now to FIG. 1, the flow diagram of the preferred process is illustrated. The reactor 10 is shown as a generally tubular reactor which discharges into a mixing tee 11 in line 12. Line 12 receives a stream of recycled aqueous ammonium phosphate solution at a recycle rate of approximately 15 to about 50, preferably from 20 to about 45, weight parts recycle per part of reactor product. The recycle is supplied to the mixing tee 11 by pump 14 which draws liquid from line 48 of a recycle loop containing aqueous ammonium phosphate solution. The inlet of the mixing tee portion of line 12 can bear mixing means in the form of orifice plate 18 to insure thorough turbulence and mixing of the crude product from reactor 10 with the recycle liquid. The admixture of crude reactor product and recycle liquid can be passed through line 20 to pump 22 for circulation return to the shell side of heat exchangers 24 and 26. A bleed stream of product is withdrawn from the recycle loop through valve 23 and this is passed through cooler 24 where its temperature is reduced to about ambient and then passed to storage tank 16 via line 47. Ammonium phosphate product is withdrawn from tank 16 by line 17. Water is added through line 28 in an amount sufficient to control the dilution of the reactor products and maintain the liquid in the recirculating stream at the desired concentration.

The preferred embodiment shows quenching of the entire effluent from the reactor in a recycle stream. Alternatively, the reactor effluent could be discharged into the liquid or vapor space of a vessel containing an ammonium phosphate solution, e.g., tank 16. When discharged into the vapor space of such a vessel, the vapor of the effluent, chiefly steam, will separate from the liquid, thereby increasing the amount of water which must be added to the liquid to maintain the desired concentration of ammonium phosphate in the solution within the tank 16 over that necessary when the entire effluent is quenched by injection into the liquid within the tank 16.

Wet-process phosphoric acid from supply 30 is passed through line 32 with its flow controlled by valve 34 at a relatively constant rate. The liquid is introduced into the reactor and is intimately contacted therein with ammonium vapors introduced through line 36 at a rate which is controlled by valve 38. The flow of ammonia vapors into admixture with the phosphoric acid is controlled in accordance with the invention at a rate which is sufficient to maximize the temperature of the reaction in reactor 10 to a value from about 525° to about 775°F., the temperature attained being dependent on the amount of water in the feed acid. The ammonia vapor is supplied to line 36 from the storage of liquid ammonia at 40 through line 42 which passes to the tube side of heat exchanger 24 where the ammonia is preheated sufficiently to vaporize the ammonia and supply the vapors for the reaction in reactor 10.

The amount of ammonia that is sufficient to maximize the temperature within reactor 10 is insufficient to achieve the neutralization of the phosphoric acid to the desired vaue, e.g., a pH value from about 5.5 to about 8.5. This will provide a nitrogen to $P_2O_5$ weight ratio in the product from 0.25 to 0.08 throughout the operational temperature range. Since a substantial amount of ammonia is not fixed in the product at the elevated reaction temperature, the amount of ammonia supplied to the reactor is from 1.5 to 2.25 times the amount of ammonia fixed as ammonium phosphate in the reactor effluent. The excess ammonia is reacted, however, when the reactor effluent is quenched with the cool recycle solution. The weight ratio of gaseous ammonia to the $P_2O_5$ of the feed acid supplied as reactants to the reactor can, therefore, be from about 0.12 to about 0.56, preferably from about 0.15 to about 0.5. Generally, the amount of ammonia introduced into the reactor will be less than that required for the neutralization. Accordingly, additional ammonia is passed through line 44 at a rate controlled by valve 46 to admixture with the recycle liquid being discharged from pump 22 and this amount is controlled to neutralize the acid to the aforementioned desired pH value.

The reaction is preferably controlled at the maximum or peak temperature that can be achieved. This will vary somewhat, depending on the acid concentration and impurity content. Since the maximum temperature achieves maximum conversion to polyphosphate, the reaction is performed at the maximum or peak temperature. This temperature can be readily determined for any feed acid by variation of the ammonia flow into the reactor until the peak temperature is achieved, i.e., until the temperature is observed to increase and then decrease as the amount of ammonia flow into the reactor is increased.

In some instances, particularly with acids of high concentrations of $P_2O_5$ and/or impurities, the reaction with ammonia may not be readily initiated in a short reactor. This occurs since these acids are very viscous and the reaction becomes mass transfer limited. Under such conditions, the ammonia fails to become sufficiently mixed with the acid for initiation of the reaction within the short residence time in the reactor. Longer reactors with greater residence time to provide a preheating or initiation section can be used; however, this approach is not optimum for processing and, therefore, is not preferred.

More desirably, when the aforementioned difficulties are observed, reduction of the feed acid's viscosity will generally permit initiation of the reaction and attainment of the desired peak reaction temperature in a reactor of optimum length. To permit the use of reactors of minimal length, it has been found that the viscosity of the feed acid at the inlet to the reactor should be less than a maximum value which, typically, is about 2500 centipoises at the reactor inlet to achieve initiation of the reaction and, preferably, less than 2000 centipoises to insure sufficient mixing and reaction time to attain a peak reaction temperature. Various methods to reduce the acid's viscosity can be used, e.g, the acid can be diluted or can be preheated so that its inlet viscosity is lowered.

It has also been found that preheating of the ammonia to the reactor can eliminate or reduce the difficulties in initiating the reaction or in achieving the peak reaction temperature, apparently since the heat transfer from the ammonia to the acid in the inlet portion of the reactor is sufficiently efficient to lower the acid's viscosity rapidly and permit adequate mixing for the reaction. Accordingly, it is preferred to provide an ammonia preheater as heat exchanger 25. Steam can be supplied from line 27 to the tubes of this exchanger to heat the ammonia passed through the shell of the exchanger. The degree of preheating can then be varied, as needed, for any particular feed acid.

An advantage of the tubular reactor is that it can be employed at very high specfic mass flow rates, thereby minimizing the capital costs of a plant. Typically, mass flow rates from 75 to about 300, preferably from 100 to about 200 pounds per second per square foot of flow area can be used.

The reactor effluent is quenched from the aforementioned reaction temperature to a temperature of about 120° to about 190°F. immediately upon admixture with the recycle liquid in mixing tee 11. This liquid is cooled approximately 10° to about 20°F. during its passage through heat exchanger 24 and is further cooled to a temperature of about 150°F. by passage through the exchanger 26. Cooling water is introduced into the exchanger 26 through line 50 at a rate controlled by valve 52 to maintain the outlet temperature of the ammonium phosphate liquid in line 48 at a temperature of about 125° to about 175°F., preferably about 140° to about 160°F. The recycle solution of ammonium phosphate can have a concentration from 15 to 40 weight percent $P_2O_5$ with from 0 to about 75 percent of the phosphate present as acyclic polyphosphate. The solution pH value should be from about 5.5 to about 8.5.

The amount of liquid ammonium phosphate solution circulated through the recycle facilities should be sufficient to provide a recycle ratio in tee 11 of from 20:1 to about 60:1, preferably from 30:1 to about 50:1, weight parts recycled liquid per weight part fresh product from the reactor.

Figure 2:
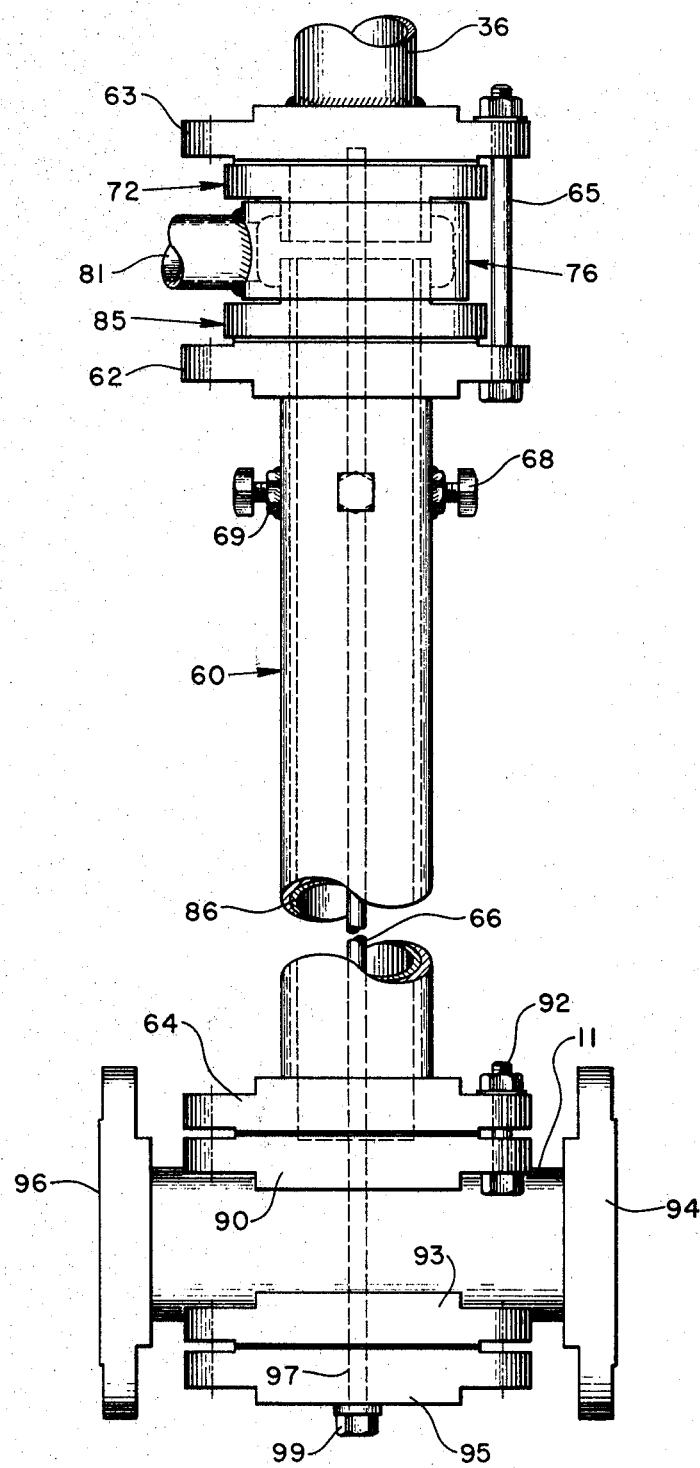
FIG. 2 is a diagram of the tubular reactor used in the preferred process.

FIG. 2 illustrates the tubular reactor used in the preferred process. The preferred reactor is generally tubular with a length to internal diameter ratio from 10 to about 35, preferably from 15 to about 25. The reactor comprises a supporting metal shell 60 which is internally lined to a substantial thickness, e.g., from 0.1 to about 1 inch, preferably from about 0.15 to about 1 inch, preferably from about 0.25 to about 0.7 inch, with solid polytetrafluoroethylene resin. A commercially available resin useful for this service is Teflon. The resin has a weight average molecular weight from about 390,000 to 9,000,000. The resin has a crystalline structure at its normal service temperature up to 500°F. At temperatures above 500°F., the physical properties of the resin degrade and, at about 600°F., the resin becomes an amorphous transparent gel. Accordingly, the resin is not recommended for use at temperatures above 500°F. and is considered entirely unsuited for use in services at temperatures of 600° F. or greater. This invention, however, utilizes the resin at temperatures where its physical properties are degraded and, preferably, at temperatures above its gel transition temperature. It is believed that under such conditions the resin ablates and thereby avoids the accumulation of scale deposits on the resin liner walls.

The supporting metal shell is employed to provide the necessary structural strength to the reactor. The metal shell can be of stainless steel or of mild steel. The resin lining is preferably a molded or extruded tubular member 86 which has an outside diameter permitting its insertion into the reactor shell 60. The inlet end of the reaction zone is defined by an ammonia sparger 72 and spacer 85, within a phosphoric inlet header, which are formed from plates or plugs of the solid polytetrafluoroethylene resin and these can be sealed to the tubular member 86 to isolate the metal shell 60 from all contact with the reaction zone contents, if desired. In practice, it has not been found necessary to seal the metal shell 60 from contact with the reaction zone contents since, even with a shell formed of mild steel, no significant corrosion has been experienced. Because the polytetrafluoroethylene liner 86 has a low heat conductivity, the metal shell 60 remains relatively cool and at a temperature where any minor amounts of the reaction product that may seep between the tubular member and shell are substantially non-corrosive and non-scaling, thereby eliminating the need for sealing of the metal shell from all contact with the reactants.

The metal shell 60 bears, on opposite ends, conventional pressure vessel flanges 62 and 64. The inlet assembly of the reactor is formed between end flange 62 and flange 63 and is secured by a plurality of tie bolts 65. The ammonium sparger 72 of the inlet assembly is positioned on the inboard side of flange 63. The construction details of this sparger are shown by FIGS. 3 and 4. Referring now to FIGS. 3 and 4, the ammonia sparger is formed of the polytetrafluoroethylene resin and comprises a plug 71 bearing an annular flange 73. The solid plug 71 is provided with a plurality of bores 74 spaced about its central portion. The sparger 72 also has a central bore 75 which serves to receive the free end of thermowell 66. Plug 71 of sparger 72 fits into the through opening of the phosphoric acid inlet header 76. This inlet header is secured to conduit 32 that supplies the phosphoric acid to the reactor. The details of construction of this inlet header are shown in FIGS. 5 and 6.

Referring now to FIGS. 5 and 6, the inlet header for the phosphoric acid can be seen to comprise a ring 77 having a through opening 78 and a hollow interior or chamber 79. The ring is secured to a nipple 81 that bears conventional male threads 80 for attachment to the phosphoric acid conduit 32. Ring 77 is formed of corrosion-resistant metal, preferably stainless steel and nipple 81 of similar construction is welded thereto.

Referring now to FIG. 2, the downstream side of inlet header 76 receives, in its through opening 78, spacer 85. The construction details of the spacer 85 is shown in FIGS. 7 and 8 where it is shown to comprise a plug 82 that bears an annular flange 83 and a central through opening 84. The through opening 84 is of the same diameter as the outside diameter of the reactor tubular member 86 while the external diameter of plug 82 is of the same diameter as through opening 78. The upstream end of plug 82 extends into chamber 79 within the inlet header 76 and opposes in a spaced opposition the inboard end of plug 71 of the ammonia sparger 72. These plug faces are separated by a distance of 0.1 to about 1, preferably from 0.25 to about 0.5 inch.

The tubular member 86 extends into the through opening 84 of spacer 85 and terminates flush with the upstream face of spacer 85 at the aforementioned spacing from the discharged face of the ammonia sparger 72. The tubular member 86 is coextensive with the metal shell 60 and, at its discharge end, terminates generally at the downstream face of flange 64. As previously mentioned, member 86 can fit loosely in the shell 60 and a plurality of radial spacing means in the form of machine screws 68 can be provided in bores through the reactor wall to restrain the member 86. The screws are retained by nuts 69 which are welded to the reactor 60.

The polytetrafluoroethylene tubular member 86 will exhibit some permanent deformation upon being heated to the reaction temperature. This deformation comprises from 1 to about 3 percent expansion. Accordingly, the dimensions of the member should be undersized to permit such deformation or it will be necessary to cool and disassemble the reactor to permit resizing of the member 86. The machine screws 68 will restrain the upstream end of tubular member 86 and prevent its axial expansion from closing the gap between the opposed faces of sparger 72 and spacer 85. If desired, abutments of fixed dimensions can be carried on the face of one or both of sparger 72 and the end of tubular member 86 to insure that the face-to-face spacing of these members is not decreased to less than the desired dimension.

The phosphoric acid which is introduced into the inlet header 76 through nipple 81 passes into the annulus within chamber 79 about the plug 82 and flows between the faces of plug 82 and plug 71 and into contact with the ammonia introduced through bores 74 of ammonium sparger 72. The combined phosphoric acid and ammonia streams then flow into the open end of tubular member 86.

Flange 64 is secured to mixing tee 11 by a flange plate 90 that is welded to one side thereof. Tie bolts 92 are used to secure this assembly. Tee 11 bears, at its opposite ends, conventional flange plates 94 and 96 which are secured to the recycle lines 12 and 20, shown in FIG. 1. The tee 11 also bears another flange plate 93 to which is secured line flange 95 by bolt fasteners. A thermowell 66 extends through bore 97 in line flange 95 and is welded thereto. This thermowell can be a metal tube which should be coated with a film of polytetrafluoroethylene or encased in a sheath of the polymer. A thermowell of solid polytetrafluoroethylene could also be used, however, a polymer-covered metal tube is preferred because of its greater strength and rigidity. To insure accurate temperature measurements, it is preferred to minimize the thickness of the polytetrafluoroethylene coating on the metal thermowell to not exceed about 0.1 inch. The inboard end of the thermowell extends through and is supported by the central bore 75 of sparger 72. The outboard end of this thermowell is threaded and bears a conventional nut 99. The nut 99 has a packing gland through which is passed a pair of electrical conductors to a thermocouple (not shown) which extends into the elongated thermowell 66. The thermocouple can, preferably, be positioned at any point along the distance of thermowell 66.

Figure 9:
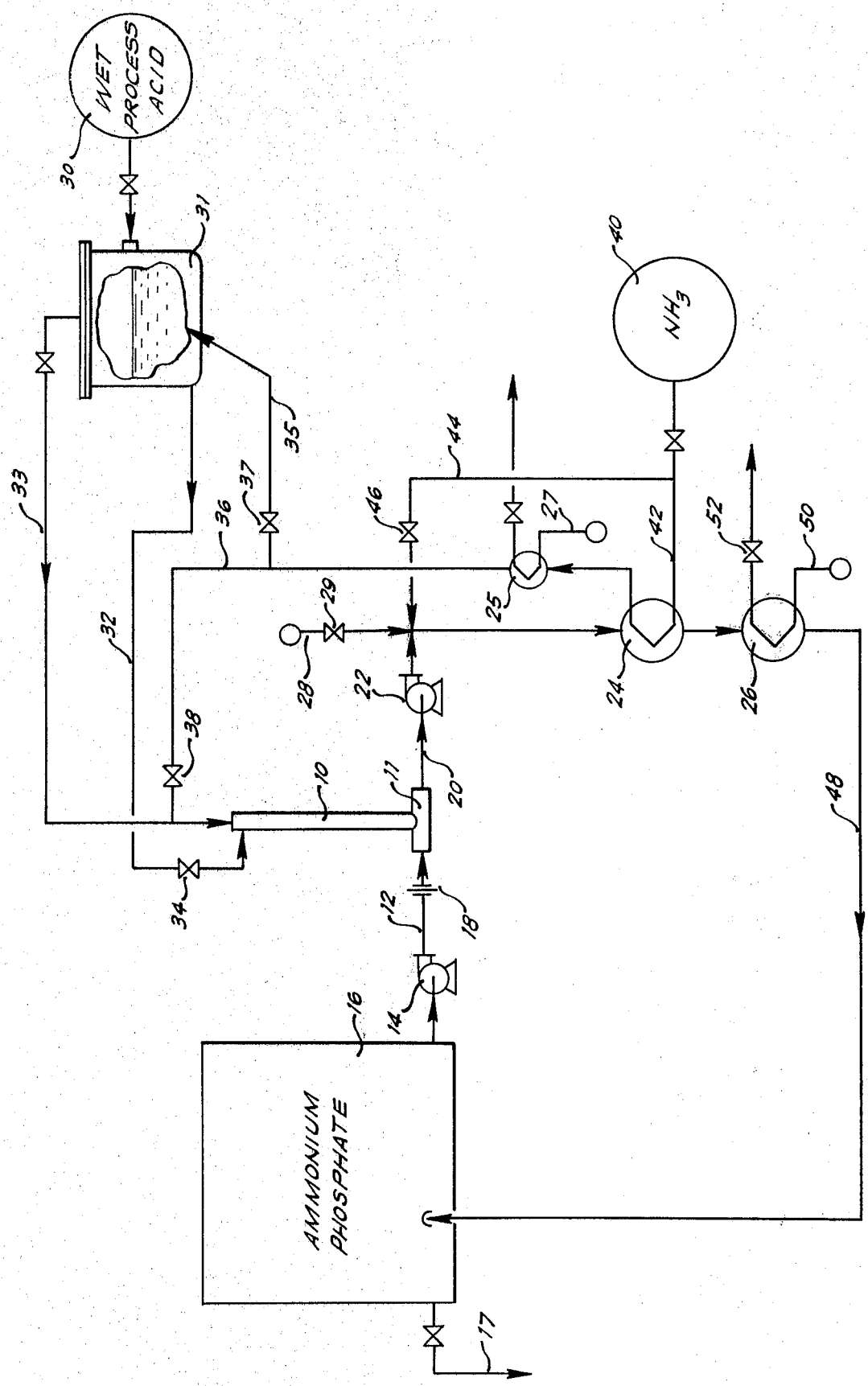
FIGS. 9 and 10 are flow diagrams of modified processes.
Figure 10:
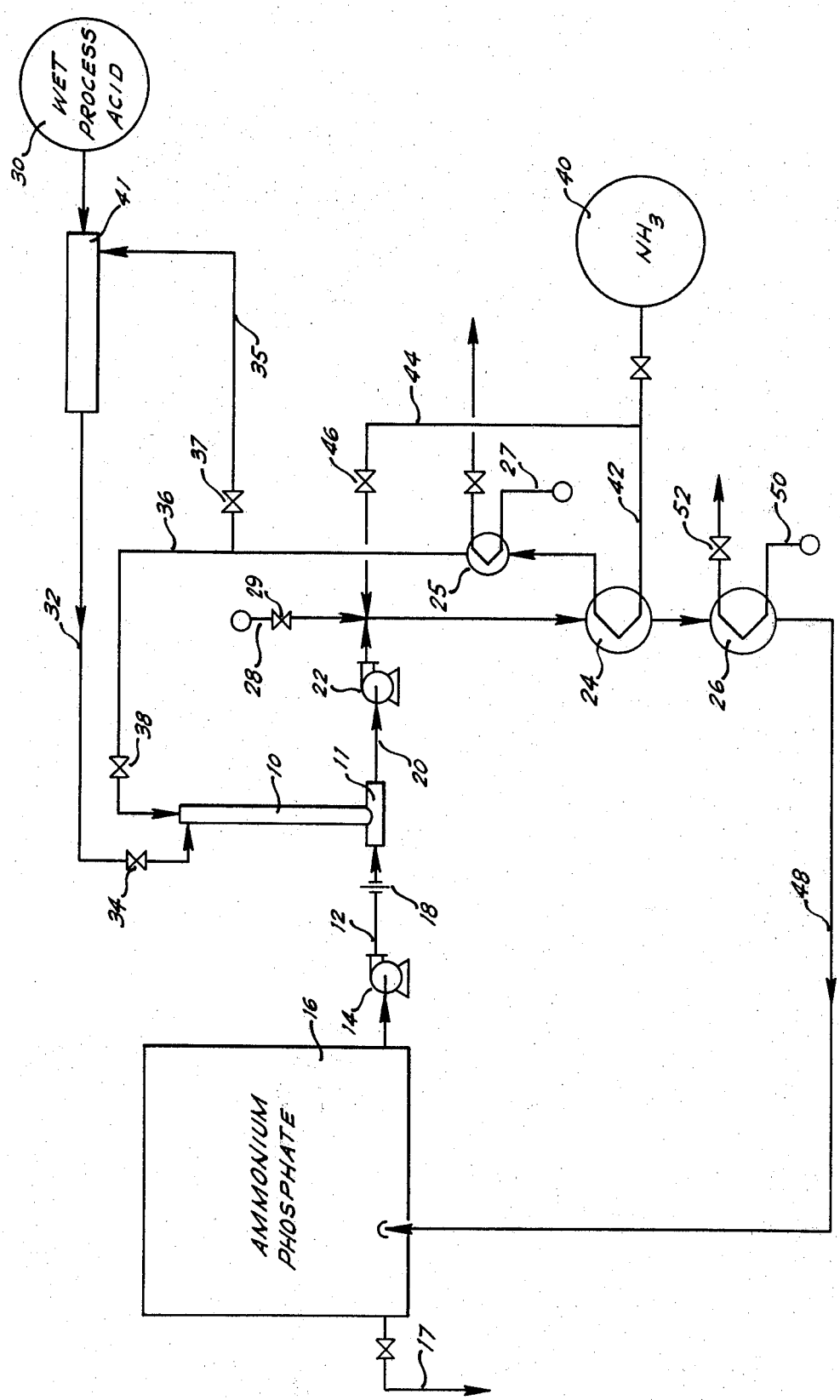

The capacity of a tubular reactor can be increased by pre-ammoniation of the wet-process phosphoric acid. FIGS. 9 and 10 illustrate typical processes employing pre-ammoniation reactors. As shown in FIG. 9, the wet-process acid can be introduced into a vessel 31 where it is contacted with ammonia that is introduced through line 35 at a rate controlled by valve 37 to achieve a temperature in vessel 31 from 150° to about 350°F., preferably from 200° to 300°F. The amount of ammonia required to achieve these temperatures comprises from 15 to about 30 percent of the ammonia which is passed through line 42 and reactor 10. The intermediate product from vessel 31 can then be pumped through line 32 to reactor 10. The vapors which separate from the intermediate product in vessel 31 can be passed through line 33 to blend with the ammonia from line 36. Preferably, vessel 31 is maintained at a superatmospheric pressure, e.g., up to about 100 psig, to permit the direct pressurization of the liquid and vapor effluents therefrom into reactor 10.

FIG. 9 illustrates an alternative but less preferred cooling of the recycle and product stream. If desired, the entire stream of quenched product and recycle can be passed through heat exchangers 24 and 26 and then to storage tank 16. This is less preferred than the system illustrated in FIG. 1 since it results in a higher temperature of the ammonium phosphate solution in tank 16, thereby creating a greater tendency for hydrolysis of the polyphosphate in the solution.

FIG. 10 illustrates an embodiment in which the preammoniation is performed in a tubular reactor 21. The entire effluent, which is a vapor and liquid mixture, is passed through the reactor into line 32. The temperature and pressure conditions in reactor 41 can be the same as the aforedescribed reactor 31.

Because reactors 31 and 41 are operated at mild conditions of temperature and pressure, solid deposits of precipitates and scale are not encountered. Accordingly, these reactors can be entirely metallic, without any polytetrafluoroethylene liner. Stainless steel is preferred for construction of these vessels to minimize corrosion problems. When a tubular reactor such as 41 is used, it can be integral with reactor 10 and can be an extension of the metal shell 60 of reactor 10.

Figure 11:
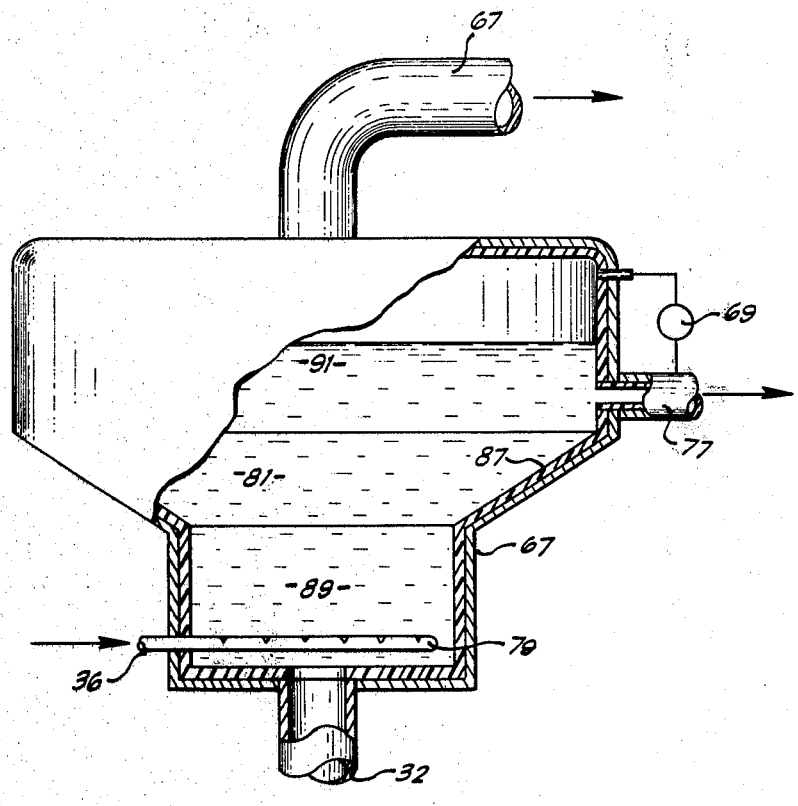
FIG. 11 illustrates another reactor for the process.

Although tubular reactors are preferred to minimize the capital costs of a plant, other reactor designs can also be used. FIG. 11 illustrates a suitable reactor which has an outer supporting metal shell 61 and an inner liner 87 formed of the aforementioned polytetrafluoroethylene. The thickness and physical properties of this liner are as described with regard to liner 86 as shown in FIG. 2. The reactor has a lower section 89 and an upper section 91 of greater diameter connected together by a conical portion 81. The lower section 89 has an inlet nozzle for connection to the wet-process phosphoric acid supply line 32 and a distribution header 79 for connection to the ammonia line 36. The reactor could be of uniform diameter to simplify construction, however, the illustrated shape is preferred to minimize the liquid residence time while still providing adequate vapor-liquid disengagement surface. The liquid effluent is withdrawn through nozzle 77 and a level control means 69 can be provided to maintain the desired liquid level in the reactor. The vapor effluent is removed through nozzle 67.

The conditions maintained in the reactor are a peak reaction temperature and sufficient pressure to maintain a liquid phase but insufficient to reduce evaporative concentration of the liquid. The peak reaction temperature is maintained from 525° to 775°F., preferably from 550° to 710°F., and the pressure can be from 1 to about 5 atmospheres. Preferably, the pressure maintained is only that sufficient to overcome the flow pressure drop of the vapor and liquid effluents.

The liquid effluent from nozzle 77 is preferably quenched by direct contact with an aqueous solution of ammonium phosphate. Typically, the effluent can be introduced into mixing tee 11 shown in FIG. 1. The vapor effluent from nozzle 67 can be blended with the quenched product and recycle liquid to absorb therein condensible ammonia vapors and steam. The remainder of the process is as described with regard to FIG. 1.

The process is described with reference to the presently preferred apparatus in the following paragraphs.

In a typical embodiment, the reactor shell 60 is 5 feet in length and is formed of a mild or carbon steel tube having an outside diameter of 4 inches. The tubular member 86 is formed of Teflon with a length of 64 inches, a 3 inch outside diameter and a wall thickness of ½ inch. The mixing tee is formed of 4 inch outside diameter mild or carbon steel piping. A total of thirteen bores 74 are provided through the Teflon plug 72 of the ammonium distributor, each with a diameter of 0.3125 inch. The face-to-face spacing between sparger 72 and spacer 76 is 0.375 inch.

The aforedescribed reactor is used for the production of ammonium polyphosphates by supplying wet-process phosphoric acid having a concentration of 70 weight percent $P_2O_5$ and containing approximately 50 percent of its phosphorus as polyphosphoric acids to the inlet header 76. The acid is supplied at a feed rate of about 10 gallons per minute and at ambient temperature. The inlet pressure of the reactor is about 20 psig. Ammonia is vaporized in heat exchanger 24 and the vapors are supplied to the ammonia sparger at a rate of 5 gallons per minute of liquid, the amount of ammonia being controlled to peak the reaction temperature at about 725°F. The maximum temperature is found to be attained at approximately 12 inches from the inlet end of the reactor and to remain relatively constant throughout the remainder of the reactor. An aqueous ammonium phosphate solution having a composition of 10 weight percent nitrogen and 34 weight percent $P_2O_5$ is maintained in vessel 16 at 150°F. and is pumped to the mixing tee by pump 14 at a rate of about 300 gallons per minute, sufficient to supply a weight ratio of recycle liquid to fresh reactants of about 40/1. Approximately 7.5 gallons per minute of ammonia are supplied through line 44 to control the pH of the recycle liquid at a value of about 6.3. Water is also introduced through line 28 to maintain the concentration of the ammonium phosphate solution constant.

The reactor is used for a prolonged period of about 100 hours under the aforedescribed conditions with a variety of concentrated wet-process phosphoric acids. Throughout the use of the reactor, no difficulty is experienced with the deposition of precipitates. Upon completion of about 100 hours of use, the reactor is disassembled and it is observed that the Teflon tubular member 86 is intact and free of deposits. It is observed that the member 86 is changed in physical appearance from its original opaqueness to a clear, translucent state. Careful inspection of the tubular member 86 reveals that a slight amount of the member has been ablated by the reaction and pitting to depths of from 10 to about 20 mils is apparent on the inside surfaces of the member 86.

The reactor was employed for a series of experiments in which phosphoric acids of varied concentration are reacted. The varied concentration of the acids was achieved by blending together different proportions of a merchant grade, nominally 52 percent $P_2O_5$ acid and a commercial super acid of nominally 72 percent $P_2O_5$ content. The acids were blended together at the inlet of the acid feed pump which discharged into conduit 32. Samples of the acids were taken periodically during each experiment and the following tabulates the average acid composition for each experiment:

| Exper. No. | $P_2O_5$ % | Water % | $SO_3$ % | Metal Oxides % | Polyphosphoric Acid |
|---|---|---|---|---|---|
| 1 | 67.7 | 21.3 | 0.96 | 5.1 | 49.4 |
| 2 | 63.7 | 27.2 | 0.9* | 4.8* | 4.0 |
| 3 | 62.8 | 28.3 | 0.8* | 4.4* | 1.0 |
| 4 | 61.3 | 30.6 | 0.8* | 4.3* | 0 |
| 5 | 53.6 | 33.3 | 0.7* | 4.0* | 0 |

*Calculated, additive values.

The distribution in weight percent of the metal impurities, expressed as oxides, in the acids used in Experiments 1 and 2 were as follows:

| Acid | MgO | $Fe_2O_3$ | $Cr_2O_3$ | CaO | $Al_2O_3$ | $K_2O_5$ | ZnO |
|---|---|---|---|---|---|---|---|
| 1 | 19.3 | 25.0 | 2.2 | 5.9 | 43.0 | 2.7 | 1.9 |
| 5 | 14.6 | 24.3 | 2.6 | 2.5 | 47.0 | 5.0 | 4.0 |

The acid blends used in Experiments 2 through 4 contained proportional distributions of the metal impurities.

The acids were supplied to the reactor together with the proper amount of ammonia, in vapor form from heat exchanger 24, to obtain a maximum or peak reaction temperature in the tubular member 86. Additional ammonia, as aqua ammonia (28% $NH_3$), was added to the recycled liquid product which was recycled at a rate of about 40 weight parts per part of reactor effluent. Water was also added to the recycled liquid. Each experiment was performed for a period of 3.5 to 4 hours and the reactor was dissassembled and inspected following each experiment. Temperatures and flow rates of reactants were observed and samples of the product were taken periodically throughout each experiment. The average values of the observed data were as follows:

| Experiment No. | Acid Rate | $NH_3$ Rate | Aqua $NH_3$ Rate | Water Rate | $NH_3$ Temperature | Reaction Temperature | Recycle Temperature | Wt. Ratio $NH_3/P_2O_5$ |
|---|---|---|---|---|---|---|---|---|
| 1 | 9.6 | 4.7 | 8.8 | 9.6 | 110°F. | 640°F. | 145°F. | 0.224 |
| 2 | 15.3 | 6.6 | 12.3 | 11.4 | 110°F. | 600°F. | 160°F. | 0.208 |
| 3 | 11.9 | 4.7 | 8.8 | 7.0 | 90°F. | 560°F. | 150°F. | 0.21 |
| 4 | 12.9 | 4.7 | 8.8 | 5.9 | 120°F. | 525°F. | 145°F. | 0.20 |
| 5. | 14.0 | 4.7 | 8.8 | 4.6 | 145°F. | 475°F. | 145°F. | 0.217 |

All flow rates expressed in gallons per minute.

The experiments were performed using a heel of an available ammonium phosphate solution which was circulated through the recycle line at a weight ratio of about 40 parts recycle liquid per part of fresh product. The recycle liquid solution was sampled before and periodically throughout each experiment. The analyses of these liquid solutions were averaged and the following mean results were obtained within the indicated standard deviations:

| Exp. No. | pH | $P_2O_5$ | % Polymer | N |
|---|---|---|---|---|
| 1 | 7.3 | 30.4 ± 1 | 73 ± 7 | 12.2 ± 1 |
| 2* | 6.7 | 33.8 ± 1 | 57 ± 6 | 9.6 ± 1 |
| 3 | 7.4 | 30.4 ± 4 | 65 ± 5 | 10.9 ± 1 |
| 4 | 6.5 | 36.5 ± 3 | 49 ± 5 | 10.5 ± 1 |
| 5 | 6.5 | 36.7 ± 3 | 43 ± 6 | 10.2 ± 1 |

*The storage temperature was about 147°F. during this experiment, exceeding the storage temperature of 134°–135°F. of the other experiments.

The conversions to polymer that were achieved in the reactor were calculated from the measured storage temperatures, pH values and storage times of the product before sampling, using known hydrolysis rate coefficients for ammonium polyphosphates. The results determined are presented in the following table as percent polymer, i.e., the weight percent of the phosphorus converted to polymeric phosphate and as the percent of the theoretical conversion at the reaction conditions:

| Experiment No. | Percent Phosphorus Converted To Polymer | Percent of Theoretical |
|---|---|---|
| 1 | 85 ± 6 | 97 ± 6 |
| 2 | 67 ± 7 | 79 ± 8 |
| 3 | 71 ± 6 | 89 ± 8 |
| 4 | 60 ± 6 | 80 ± 8 |
| 5 | 53 ± 9 | 87 ± 14 |

The preceding examples are intended solely to illustrate a preferred mode of practice of the invention and to demonstrate results obtainable thereby. It is not intended that the examples be unduly limiting of the invention. Instead, the invention is intended to be defined by the steps and elements, and their obvious equivalents, set forth in the following claims.

We claim:

1. The method of producing ammonium polyphosphates by the adiabatic reaction of ammonia and phosphoric acid including the steps of continuously introducing phosphoric acid having a $P_2O_5$ content of about 56 to about 70 weight percent into an adiabatic reactor and into admixture with ammonia continuously injected into said reactor at a rate corresponding to about 0.12 to about 0.56 weight parts ammonia per weight part $P_2O_5$, reacting said acid with said ammonia and partially neutralizing said acid, said acid concentration and ammonia injection rate being sufficient to adiabatically maintain a reaction temperature of about 525° to about 750°F., said reaction temperature being above the gel transition temperature of the polytetrafluoroethylene resin liner hereinafter detailed and sufficient to render said resin ablative in the presence of said acid and ammonia and to evaporate water from said acid, concentrate said acid and form ammonium polyphosphates therein, and carrying out said reaction in a reaction zone comprising a supporting reactor shell internally lined with a polytetrafluoroethylene liner having a weight average molecular weight of about 390,000 to about 9,000,000 and a gel transition temperature below said reaction temperature.

2. The method of claim 1 wherein said shell is lined with said solid polytetrafluoroethylene to a thickness of from 0.1 to about 1 inch.

3. The method of claim 2 wherein said reactor is tubular having a length to internal diameter ratio from 10 to about 35.

4. The method of claim 1 wherein said temperature is from 620° to about 775°F.

5. The method of claim 1 wherein said temperature is maintained at a maximum value by controlling the relative rates of ammonia and phosphoric acid to the reactor.

6. The method of claim 1 wherein the product effluent from the reaction zone is discharged into contact with a sufficient quantity of an aqueous solution having a concentration of from 15 to 40 weight percent $P_2O_5$ as ammonium phosphates, a pH value from 5.5 to about 8.5 and containing from 0 to about 75 weight percent of said $P_2O_5$ as acyclic polyphosphates, to reduce the temperature of said product effluent to a temperature no greater than about 190°F.

7. The method of claim 6 wherein the entire effluent from the reaction zone is contacted with said aqueous solution.

8. The method of claim 7 wherein said aqueous solution comprises cooled reaction product.

9. The method of claim 8 wherein said aqueous solution is continuously circulated in a recycle loop into contact with said product effluent at a recycle rate from 20:1 to about 60:1 parts per weight part of said product effluent and through a cooling step to maintain its temperature from about 125° to 175°F.

10. The method of claim 9 wherein ammonia is added to said aqueous solution in said recycle loop in a sufficient amount to maintain said pH value of said aqueous solution.

11. The method of claim 9 wherein water is added to said aqueous solution in said recycle loop in a sufficient amount to maintain said concentration of ammonium phosphates.

* * * * *